United States Patent
Jaussaud et al.

(10) Patent No.: US 12,240,150 B2
(45) Date of Patent: Mar. 4, 2025

(54) INJECTION TOOLING FOR BARREL-SHAPED ROTATING PART

(71) Applicant: SAFRAN AIRCRAFT ENGINES, Paris (FR)

(72) Inventors: Raoul Jaussaud, Moissy-Cramayel (FR); Hubert Jean Marie Fabre, Moissy-Cramayel (FR); Paul Terry, Franklin, NH (US)

(73) Assignee: SAFRAN AIRCRAFT ENGINES, Paris (FR)

( * ) Notice: Subject to any disclaimer, the term of this patent is extended or adjusted under 35 U.S.C. 154(b) by 84 days.

(21) Appl. No.: 17/928,114

(22) PCT Filed: May 26, 2021

(86) PCT No.: PCT/FR2021/050952
§ 371 (c)(1),
(2) Date: Nov. 28, 2022

(87) PCT Pub. No.: WO2021/245338
PCT Pub. Date: Dec. 9, 2021

(65) Prior Publication Data
US 2023/0241808 A1    Aug. 3, 2023

Related U.S. Application Data

(60) Provisional application No. 63/034,700, filed on Jun. 4, 2020.

(51) Int. Cl.
*B29C 33/42* (2006.01)
*B29C 33/48* (2006.01)
(Continued)

(52) U.S. Cl.
CPC ............ *B29C 33/42* (2013.01); *B29C 33/485* (2013.01); *B29C 70/48* (2013.01); *F01D 25/24* (2013.01);
(Continued)

(58) Field of Classification Search
CPC ....... B29C 33/42; B29C 33/485; B29C 70/48; F01D 25/24; B29L 2031/7504; F05D 2220/36; F05D 2300/44; F05D 2300/603
See application file for complete search history.

(56) References Cited

U.S. PATENT DOCUMENTS

| | | |
|---|---|---|
| 4,209,161 A | 6/1980 | Horvath |
| 8,322,971 B2 | 12/2012 | Coupe et al. |
| 10,166,708 B2 | 1/2019 | Magnaudeix et al. |

FOREIGN PATENT DOCUMENTS

| | | |
|---|---|---|
| EP | 2 755 815 A1 | 7/2014 |
| JP | H07-243512 A | 9/1995 |
| WO | WO 2013/037466 A1 | 3/2013 |

OTHER PUBLICATIONS

International Search Report as issued in International Patent Application No. PCT/FR2021/050952, dated Sep. 13, 2021.

*Primary Examiner* — Cedrick S Williams
*Assistant Examiner* — Erica Hartsell Funk
(74) *Attorney, Agent, or Firm* — Pillsbury Winthrop Shaw Pittman LLP

(57) ABSTRACT

A tooling for injecting a polymer resin into a fibrous preform for the manufacture of a revolution part in composite material including a barrel shape with an inside diameter of smaller diameter delimiting the revolution part into an upstream portion and a downstream portion of the inside diameter, the upstream portion including a back-draft intermediate portion, injection tooling wherein, to allow a demolding of the barrel-shaped part once the injection and the polymerization of the polymer resin are carried out, the (Continued)

injection tooling includes on the one hand a frustoconical drum comprising a first drum portion in direct contact with an inner surface of the portion of the revolution part downstream of the inside diameter and a second drum portion and on the other hand a segmented insert whose outer surface matches an inner surface of the portion of the revolution part upstream of the inside diameter.

11 Claims, 2 Drawing Sheets

(51) Int. Cl.
    *B29C 70/48*     (2006.01)
    *F01D 25/24*     (2006.01)
    *B29L 31/00*     (2006.01)

(52) U.S. Cl.
    CPC ... *B29L 2031/7504* (2013.01); *F05D 2220/36* (2013.01); *F05D 2300/44* (2013.01); *F05D 2300/603* (2013.01)

INJECTION TOOLING FOR BARREL-SHAPED ROTATING PART

CROSS-REFERENCE TO RELATED APPLICATIONS

This application is the U.S. National Stage of PCT/FR2021/050952, filed May 26, 2021, which in turn claims priority to U.S. patent application No. 63/034,700 filed Jun. 4, 2020. The content of these applications are incorporated herein by reference in their entireties.

BACKGROUND OF THE INVENTION

The present invention relates to the field of composite materials comprising a polymer matrix reinforced by a fibrous structure and more particularly to the use of these materials in the manufacture of aeronautical parts or of turbomachines.

In the aeronautical field, it is desired to reduce the mass of the components of the engines while maintaining their mechanical properties at a high level. More particularly, in an aeronautical turbomachine, the fan casing defining the contour of the air intake flowpath of the engine and inside which the rotor supporting the vanes of the fan is housed is now made of composite material. In a shape of revolution, it comprises a shroud provided at its upstream and downstream ends with outer clamps for the fastening to other structural portions of the engine, such as the air intake profile at the upstream and the intermediate casing at the downstream. The casing also supports various components and must be able to retain the debris resulting from a breakage of a fan blade or the objects ingested at the inlet of the engine.

The manufacture of a fan casing in composite material begins with the establishing by winding of a fiber reinforcement on a mandrel whose profile matches that of the casing to be made. The fibrous reinforcement can be made, for example, by three-dimensional or multilayer weaving as described in the patent U.S. Pat. No. 8,322,971. This fibrous reinforcement constitutes a tubular fibrous preform forming a single part. The manufacture continues by the densification of the fibrous preform by a polymer matrix which consists in impregnating the preform with a resin and polymerizing the latter to obtain the final part.

The invention relates more particularly to the manufacturing mode where the impregnation of the fibrous preform is carried out by the injection molding method called RTM (for Resin Transfer Molding). According to this method, the fibrous preform is enclosed by being compacted in a rigid mold of fixed geometry comprising a first portion forming a support of the fibrous preform and a counter-mold which is just deposited on the fibrous preform and whose shape corresponds to the casing wished to obtain, and the resin is injected under pressure and controlled temperature inside the mold after having brought the walls of the two mold portions closer to each other and having evacuated it when appropriate. Once the resin is injected, its polymerization is carried out by heating of the mold and after injection and polymerization, the final part is demolded and then cut out to remove excess resin and the chamfers are machined to obtain the desired casing.

In order to facilitate this demolding, the injection tooling, which must be perfectly sealed, generally consists of a mold with two adjacent internal drums reproducing the flowpath which has a "diabolo" shape, of two upstream and downstream flanges to form the two edges of the casing, and of a counter-mold formed of several external sectors. These sectors and the upstream/downstream flanges are withdrawn from outside. The two internal drums are uncoupled then withdrawn from each side of the casing by following the natural drafts of the flowpath.

However, in some casing configurations, there is a tightening of the flowpath at the upstream of the casing, the flowpath then having a "barrel" shape which progresses for example from a first diameter at the upstream to a second larger diameter at a central area then again to a third smaller diameter at the downstream and which therefore prohibits any demolding of the final part due to the impossibility of withdrawal of the upstream drum. The difference between small and large diameter can for example be comprised between 30 and 100 millimeters for an average diameter of the casing which can be of the order of 1,500 millimeters to 3,500 millimeters.

OBJECT AND SUMMARY OF THE INVENTION

The object of the invention is therefore to propose an injection tooling for the manufacture of a gas turbine casing in composite material having a barrel shape which allows carrying out the demolding in a simple manner, and in particular without significantly increasing the steps and the number of implemented parts.

This object is achieved thanks to a tooling for injecting a polymer resin into a fibrous preform for the manufacture of a revolution part in composite material comprising a barrel shape with an inside diameter of smaller diameter delimiting said revolution part into an upstream portion and a downstream portion of said inside diameter, the upstream portion including a back-draft intermediate portion, wherein, to allow a demolding of said barrel-shaped part once the injection and the polymerization of said polymer resin are carried out, the injection tooling includes on the one hand a frustoconical drum comprising a first drum portion in direct contact with an inner surface of said portion of the revolution part downstream of said inside diameter and a second drum portion and on the other hand a segmented insert whose outer surface matches an inner surface of said portion of the revolution part upstream of said inside diameter and an inner surface is in direct contact with said second drum portion on which said segmented insert rests, said first drum portion including a natural draft allowing a withdrawal of said frustoconical central drum from downstream and said inner surface of the segmented insert having an inclination strictly greater than a maximum slope of an outer surface of the segmented insert corresponding to said back-draft upstream intermediate portion of said revolution part, so as to allow a withdrawal of said segmented insert from upstream.

Thus, the demolding of revolution parts having a barrel shape can be achieved simply by the formation of an insert forming a support whose junction slope with the drum is greater than the maximum slope of the inner face of these barrel-shaped revolution parts.

According to a preferred embodiment, said segmented insert includes at least six, preferably eight, inserts.

Advantageously, said inserts are hollow and made impervious to polymer resin by seals.

According to one embodiment, the tooling further includes a third substantially radial drum portion ensuring the junction between said first and second drum portions at said inside diameter.

Preferably, said barrel-shaped revolution part includes successively between an upstream clamp and a downstream clamp: an upstream end portion, said back-draft upstream intermediate portion, a central portion of larger diameter, a downstream intermediate portion and a downstream end portion.

Advantageously, said frustoconical central drum and said upstream and downstream flanges are secured together by a plurality of screwed connections. However, said frustoconical central drum and said downstream flange can form a single part.

Preferably, to ensure radial and angular centering of said segmented insert on said frustoconical central drum, centering elements are disposed opposite each other on said segmented insert and said frustoconical central drum respectively.

Advantageously, said segmented insert is made of a metal material whose mechanical properties of dimensional stability facilitate the management of the expansion during the polymerization by heating.

According to a preferred embodiment, said revolution part made of composite material is a fan casing.

BRIEF DESCRIPTION OF THE DRAWINGS

Other characteristics and advantages of the invention will emerge from the following description of particular embodiments of the invention, given by way of non-limiting examples, with reference to the appended drawings, wherein.

DETAILED DESCRIPTION OF EMBODIMENTS

The invention applies generally to any revolution part made of polymer-matrix composite-material of a gas turbine. The invention will however be described below within the context of its application to a fan casing of an aeronautical gas turbine engine.

Figure 1:
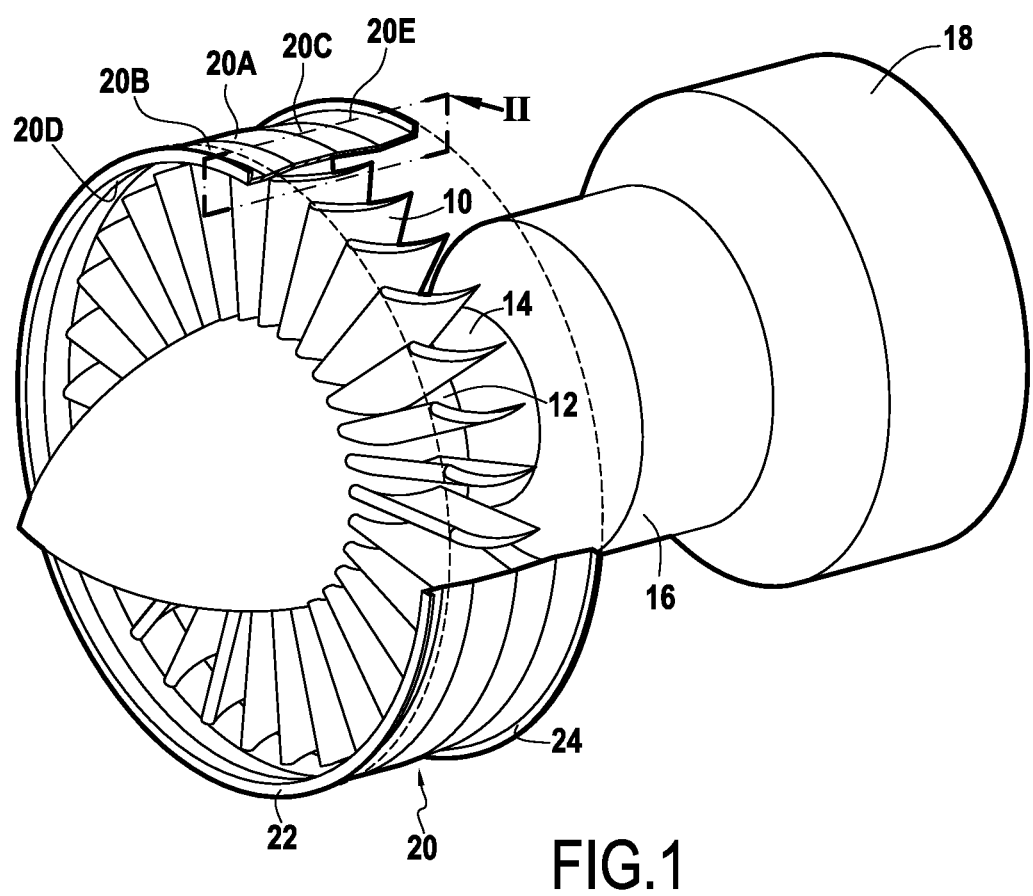
FIG. 1 is a perspective view of an aeronautical engine including a fan casing obtained from the injection tooling according to the invention.

FIG. 1 schematically shows such an aeronautical gas turbine engine comprising, from upstream to downstream in the direction of the flow of the gas stream, a fan 10 disposed at the inlet of the engine, a compressor 12, a combustion chamber 14, a high-pressure turbine 16 and a low-pressure turbine 18. The engine includes successive casings corresponding to different elements of the engine and whose inner surface defines the air intake flowpath of the engine. Thus, the fan 10 is surrounded by a fan casing 20 having a shape of revolution and made for example from carbon, glass, aramid or ceramic fiber reinforcement densified for example by an epoxy, bismaleimide or polyimide polymer matrix. The fiber reinforcement is achieved in a known manner by three-dimensional or multi-layer weaving, for example an "interlock" weave, and the matrix by the liquid route according to the known injection methods such as the molding method called RTM mentioned in the preamble.

The fan casing 20 is provided with outer clamps 22, 24 at its upstream and downstream ends in order to allow its mounting and its connection with other elements, not represented, of the engine. Between its upstream and downstream clamps, the fan casing, which has substantially a barrel shape, includes a substantially cylindrical central portion 20A having a larger diameter than substantially frustoconical upstream 20B and downstream 20C intermediate portions gradually connecting thereto on both sides along respectively an upstream slope and a downstream slope, the upstream intermediate portion 20B being in turn connected to a substantially cylindrical upstream end portion 20D ending with the upstream clamp 22 and the downstream intermediate portion 20C being in turn connected at an inside diameter 20CE (in general the smallest diameter of the flowpath delimiting the revolution part into a upstream portion and a downstream portion of this diameter) to a substantially frustoconical downstream end portion 20E ending with the downstream clamp 24. As explained in the preamble, the central portion 20A of larger diameter, by generating the back-draft upstream intermediate portion 20B prohibits the recourse to the standard RTM injection tooling and therefore requires developing new tooling. In addition, the presence of two drafts towards smaller diameters makes the casing non-demoldable.

According to the invention, it is thus proposed, for solving the problem posed by the demolding of a casing having a barrel shape, to add between the casing support drum and the casing a plurality of inserts which fill the non-demoldable portion of this casing by making the demolding possible again. The drum also has on its downstream portion a natural draft also facilitating its withdrawal once the inserts are removed.

Figure 2:
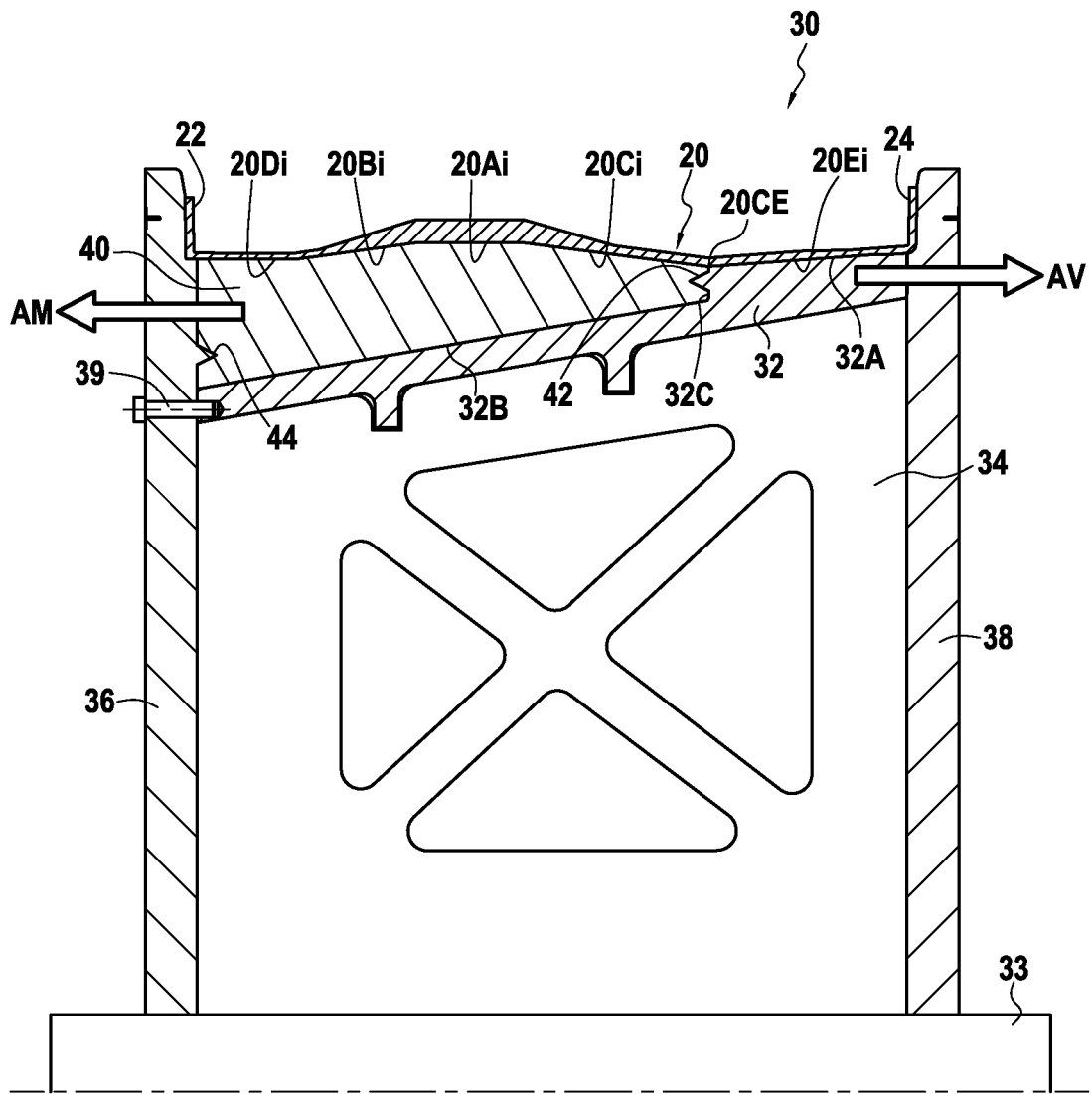
FIG. 2 is an axial sectional half-view of the injection tooling allowing the manufacture of the fan casing of FIG. 1.

FIG. 2 shows a section of the injection tooling according to the invention supporting the fan casing 20 without the external segmented counter-mold conventionally closing the mold.

More specifically, according to the invention, this tooling 30 includes a frustoconical central drum 32 held on a drive shaft 33 by a plurality of stiffening spokes 34, preferably partially perforated to reduce the mass, as well as an upstream flange 36 and a downstream flange 38. The frustoconical central drum is downstream of the inside diameter 20CE on an end portion 32A in direct contact with the inner surface 20Ei of the downstream end portion 20E to allow a withdrawal of the drum from downstream following the natural draft of the flowpath. The upstream and downstream flanges for the molding of the outer clamps 22, 24 are secured to the frustoconical central drum 32 for example by a screwed connection (see reference 39 for the upstream flange, the connection to the downstream flange being outside the cutting plane). It will be noted that the downstream flange 38 and the frustoconical central drum 32 could however also come from the same part.

This tooling further includes a segmented insert 40 of at least six and typically eight contiguous inserts and disposed around the central drum 32 to support the fiberous preform 20 upstream of the inside diameter 20CE. During the assembly, the inserts are laid on the flange 38 in turn then laid flat and rest on the central drum 32 due to the gravity which tends to press them against this drum. They are also held angularly and radially by means of centering cones 42 disposed on the face 32C. The flange 36 is then added and other centering elements 44 disposed on this flange stress the insert to ensure its final maintenance. The inserts must indeed be well adjusted with the central drum because the injection of the resin is carried out under pressure after vacuum generation in the mold. The mechanical properties of dimensional stability of the material of the insert (typically steel) and of the drum facilitate the success of the injection and in particular the management of the expansion during the polymerization by heating. Of course, conventional seals (not represented) must also be provided between the different parts of the mold to ensure that it is properly sealed.

More specifically, the segmented insert whose outer surface matches the casing portion upstream of the inside diameter 20CE, that is to say both the inner surface 20Ai of the central portion 20A, the inner surfaces 20Bi and 20Ci of the upstream 20B and downstream 20C intermediate portions and the inner surface 20Di of the upstream end portion 20D, has an inner surface 32B forming the largest portion of the truncated cone of the drum 32 (the smallest portion being formed by the surface 32A and these two portions of the truncated cone meeting at the inside diameter 20CE by a radial surface 32C forming a recess) and whose inclination is strictly greater than that of the back-draft upstream intermediate portion 20B whose upstream slope is the greatest upstream slope of the casing 20 (the downstream slope of the portion 20C can indeed be greater as illustrated). It will be noted that the slope of the inner surface 32B must imperatively be greater than the greatest slope on the side where the demolding will be carried out (if there were for example several upstream slopes) and that it is preferable to choose as demolding side the one which will allow the lowest slope to prevent in particular the insert from being too massive.

The injection process during its molding phase does not differ from the conventional RTM injection process, the fiberous preform being placed in the closed mold in a sealed manner. Then, the low-viscosity thermosetting liquid resin is injected into the mold to impregnate the entire fibrous portion of the preform. The polymerization is then generally carried out by heating of the mold according to one or more consecutive cycles to achieve the desired degree of densification. Once the injection and the polymerization are completed, the part finally obtained can then be demolded according to the simplified steps compared to those implemented in the conventional process due to the modification of the tooling.

The demolding steps differ from the standard steps but are nevertheless simplified since at the end of the polymerization step, the counter-mold having been withdrawn in a first step of the demolding and the external surface of the final part therefore having the external barrel shape of the casing to be made, it suffices in a second step to withdraw the upstream flange 36 (after unscrewing the fasteners 39 connecting it to the central drum) in order to release the segmented inserts 40 which can be withdrawn one after the other (or a first half then a second half) along the upstream, identified in FIG. 2 by the direction AM, more specifically along the direction of the slope 32B. The frustoconical central drum 34 detached or not from the downstream flange 38 (after possible unscrewing of the fasteners to the drum) can then be in turn withdrawn in a following step according to the downstream identified by the opposite direction AV, releasing the final part which can finally be cut out to remove excess resin and thus obtain the fan casing 20. Alternatively, the drum 32 and the flange 38 can be held in place and it is the final part that is withdrawn towards the upstream with any appropriate withdrawal (lifting) means.

For all these steps, due to their dimensions (several meters in diameter) and their masses (several tons), all these parts must be handled with care and the withdrawals will therefore be preferably carried out by means of a hoist, straps or any other similar lifting system, each of the parts of the mold then including members necessary for their displacement. These handling members (not represented) comprise for example fastening bores cooperating by screwing with tie-down rings mounted on nut heads or any other bore. In general, the technique for handling and fastening large parts relative to systems for handling heavy and/or bulky loads, via tie-down rings screwed to said loads, is of the type known per se. Note however that to reduce the lifted mass, the inserts will be preferably hollow but made perfectly impervious to polymer resin (this sealing being made by seals not represented on the face 32) so that they are prevented from being filled with polymer resin during the injection phase.

It will also be noted that to avoid any deterioration of the final part during the successive withdrawal steps, this part will be preferably held by means of a handling ring, a strap or any other equivalent means for handling large revolution parts. Thus, the final casing part does not include a specific member for its manipulation and is not likely to be deteriorated during this handling.

The invention claimed is:

1. A tooling for injecting a polymer resin into a fibrous preform for the manufacture of a revolution part in composite material comprising a barrel shape with an inside diameter of smaller diameter delimiting said revolution part into an upstream portion and a downstream portion of said inside diameter, said upstream portion including a back-draft intermediate portion, wherein, to allow a demolding of said barrel-shaped part once injection and polymerization of said polymer resin are carried out, the tooling for injecting includes on the one hand a frustoconical central drum comprising a first drum portion in direct contact with an inner surface of said portion of the revolution part downstream of said inside diameter and a second drum portion and on the other hand a segmented insert whose outer surface matches an inner surface of said portion of the revolution part upstream of said inside diameter and an inner surface is in direct contact with said second drum portion on which said segmented insert rests, said first drum portion including a natural draft allowing a withdrawal of said frustoconical central drum from downstream and said inner surface of the segmented insert having an inclination strictly greater than a maximum slope of an outer surface of the segmented insert corresponding to said back-draft upstream intermediate portion of said revolution part, so as to allow a withdrawal of said segmented insert from upstream, and wherein the injection tooling includes an upstream flange connected with fasteners to the frustoconical central drum and configured for releasing the segmented insert which can be withdrawn along a direction of a slope of the second drum portion.

2. The injection tooling according to claim 1, wherein said segmented insert includes at least six inserts.

3. The injection tooling according to claim 2, wherein said inserts are hollow and made impervious to polymer resin by seals.

4. The injection tooling according to claim 1, further including a third substantially radial drum portion ensuring a junction between said first and second drum portions at said inside diameter.

5. The injection tooling according to claim 1, wherein said barrel-shaped revolution part includes successively between an upstream clamp and a downstream clamp: an upstream end portion, said back-draft upstream intermediate portion, a central portion of larger diameter, a downstream intermediate portion and a downstream end portion.

6. The injection tooling according to claim 1, wherein said frustoconical central drum and said upstream and downstream flanges are secured together by a plurality of screwed connections.

7. The injection tooling according to claim 1, wherein said frustoconical central drum and said downstream flange form a single part.

8. The injection tooling according to claim 1, wherein, to ensure radial and angular centering of said segmented insert on said frustoconical central drum, centering elements are disposed opposite each other on said segmented insert and said frustoconical central drum respectively.

9. The injection tooling according to claim 1, wherein said segmented insert is made of a metal material whose mechanical properties of dimensional stability facilitate the management of the expansion during the polymerization by heating.

10. The injection tooling according to claim 1, wherein said revolution part made of composite material is a fan casing.

11. The injection tooling according to claim 2, wherein said segmented insert includes at least eight inserts.

* * * * *